(12) United States Patent
Reynolds et al.

(10) Patent No.: US 7,024,373 B1
(45) Date of Patent: Apr. 4, 2006

(54) AUTO PURCHASE SYSTEM AND METHOD

(76) Inventors: Kris Reynolds, 4 Sidehill Rd., Westport, CT (US) 06880; Mark Reynolds, 4 Sidehill Rd., Westport, CT (US) 06880; Anthony H. Handal, 3 Blue Chip La., Westport, CT (US) 06880

(*) Notice: Subject to any disclaimer, the term of this patent is extended or adjusted under 35 U.S.C. 154(b) by 0 days.

(21) Appl. No.: 09/461,603

(22) Filed: Dec. 15, 1999

(51) Int. Cl.
*G06F 17/60* (2006.01)

(52) U.S. Cl. .............................. 705/14; 705/1; 705/26; 705/27

(58) Field of Classification Search ..................... 705/1, 705/14, 27, 26
See application file for complete search history.

(56) References Cited

U.S. PATENT DOCUMENTS

| | | | | |
|---|---|---|---|---|
| 5,056,019 A | * | 10/1991 | Schultz et al. | 364/405 |
| 5,892,900 A | * | 4/1999 | Ginter et al. | 395/186 |
| 6,112,181 A | * | 8/2000 | Shear et al. | 705/1 |
| 6,249,772 B1 | * | 6/2001 | Walker et al. | 705/26 |

FOREIGN PATENT DOCUMENTS

WO     WO/95/03570     *     2/1995

OTHER PUBLICATIONS

Lynne Harvey, On Birthdays, Mortgages, Ice Cream Sundaes, and Term Life How Personalization and Cross–Selling Tools Provide Cross–Selling in the Enterprise, E–Business Strategies and Solutions, Jun. 10, 1999, pp. 31–35.*

* cited by examiner

*Primary Examiner*—Richard Chelcot
*Assistant Examiner*—J. Harle

(57) ABSTRACT

The inventive communications system dedicated to the sale of first items in conjunction with the establishment of a second, preferably long-term, commercial relationship between the consumer of the first items and sellers of second items is disclosed. A central processing unit is located on the premises of a website operator. In accordance with the invention, a memory is associated with the central processing unit. The memory holds a number of interactive pages for transfer to the central processing unit. At least one of the interactive pages has at least one button associated with a consumer decision. That page further comprises information respecting a choice signified by actuation of the button. A database is coupled to the central processing unit. The database contains information respecting the cost of at least one selectable first item, information respecting at least one selectable sales condition associated with at least one second item, and information respecting discounts on the first item associated with the second item when associated with the sales condition. A modem subsystem is coupled to the central processing unit and connects the computer of a consumer to the central processing unit through a publicly accessible digital information network. The modem has the capability of transmitting a page with an interactive button to the computer of the customer. The modem is also capable of receiving and responding to an actuation of the interactive button and sending a signal indicating the actuation and an associated consumer decision to the central processing unit. A plurality of data lines connect the central processing unit through the modem subsystem to a financial institution coupling information respecting the consumer decision whereby the financial institution may make a financing decision, and coupling information respecting the financing decision from the financial institution to the central processing unit indicating completion of a transaction, the modem subsystem coupling information respecting completion of the transaction to the consumer.

9 Claims, 18 Drawing Sheets

The Car Catalog

American motors
Audi
Austin Healy
Bentley
BMW
Chrysler
Ford   ← 140
General Motors
Mercedes-Benz
Rolls-Royce
Rover
Volkswagen

Midsize Fords

FIGURE 9

Taurus
Specs
4 cylinder, 16 valve, 175 HP, etc.
Price Today: As low as $11,000, loaded
☐ Show me How!

Gemini
Specs
4 cylinder, 16 valve, 175 HP, etc.
Price Today: As low as $11,000, loaded
☐ Show me How!

Apollo
Specs
4 cylinder, 16 valve, 175 HP, etc.
Price Today: As low as $11,000, loaded
☐ Show me How!

Ford Gemini

You selected a Ford Gemini.

Click your grocery budget below
to get the cost of the car to you:

- ☐ $100 per month at ShopSmart
- ☐ $200 per month at ShopSmart
- ☐ $300 per month at ShopSmart
- ☒ $400 per month at ShopSmart Your Cost $19,000

$ 400 per month at Shop Smart for 60 months.

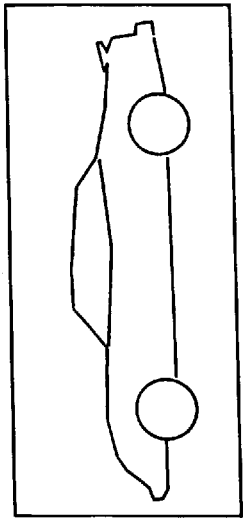

Ford Gemini, 4 cylinder, A/C, P/S, moonroof, CD
Powr Windows, ABS, Wood, Leather, Cruise

| For Sixty Months | wife 30% |
| Sixty Months | |
| Forty-eight Months | jerry 20% |
| Thirty-Six Months | |
| Twenty-four Months | |

204
206

Need Credit? Check out our financing or
the No Money Down Option.

☐ The discount is great. Sign me up!

☐ Arrange a test drive for me.

 Furniture

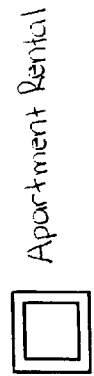 Apartment Rental

 Give Me a Suggestion!

Figure 13

Welcome to the CarX Family

In order to process your request, we need you to give us some information on your credit.

Name:
Address:
City:
State:
Zip Code:
E-Mail Address:
Telephone:
Fax:

Credit Card Number:　　　　　　　　　　　Type: ☐ VISA　☐ Mastercard
Date of Expiration:

Bank:　　　Account No.:　　　　　　　　　Branch:

Employer:　　　　　　　　　　　　　　　　Years Employed:
Address:　　　　　　　　　　　　　　　　　Position:
City:
State:
Zip Code:
E-Mail Address:
Telephone:
Fax:

☐ I certify that the above information is correct.

The CarX Catalog

⟵ 142

Gifts
vacations ⟵ 144
housing
groceries

Your Price Reduction: $3000

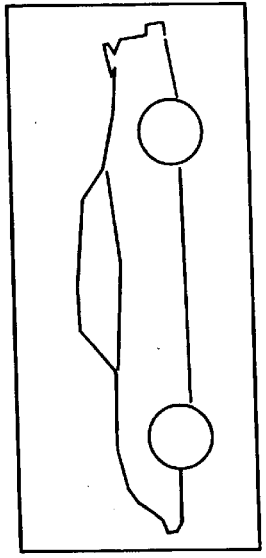

Click your grocery budget below to get your discount:

☐ $100 per month at ShopSmart
☐ $200 per month at ShopSmart
☐ $300 per month at ShopSmart
☒ $400 per month at ShopSmart Increase my discount with another category.

☐ Gas

☐ Furniture

☐ Looking for a Home

☐ Give Me a Suggestion!

Need Credit? Check out our financing or the No Money Down Option.

☐ The discount is great. Sign me up!

☐ Arrange a test drive for me.

FIGURE 17

Your Account Information ~280

Diane Doe ~284
442 Bolton Lane
Santa Anna, CA 42203

~286

Date: November 21, 1999

Purchases last Month at ShopSmart: $354.67   Minimum Commitment: $300
Purchases so far this Month:   $256.97
Purchases Required this Month:   $43.03

~288

Purchases last Month at RoadWise: $90   Minimum Commitment: $100
Debit Foward: $10
Purchases so far this Month:   $56
Purchases Required this Month:   $44

Figure 18

AUTO PURCHASE SYSTEM AND METHOD

STATEMENT REGARDING FEDERALLY SPONSORED RESEARCH OR DEVELOPMENT (Not applicable.)

BACKGROUND OF THE INVENTION

Over the past few months, Internet marketing has come to assume an increasingly important role in the marketplace. Indeed, market shifts and trends which formally took years to effect significant change, under the influence of electronic marketing, have taken commercial procedures in weeks to changes which formally took years to achieve. However, the paradigm of Internet marketing in particular, and electronic marketing generally, has failed to achieve the hoped-for profitability. Nonetheless, compared to the press, radio and most recently television, the Internet (trademark) has implemented changes breathtakingly remarkable, both in terms of the magnitude of those changes and the speed with which the same have been achieved.

Perhaps, a major part of the problem is the failure of electronic marketing schemes to depart from prior art marketing paradigms and develop sales implementation mechanisms which overcome the disadvantages of electronic commerce by providing communication interfaces, modalities and functions which combat the personality, uncertainty, consumer fear, unfamiliarity and other associated problems of the electronic marketplace.

For example, one of the primary fears in electronic commercial transactions experienced by the consumer is that an error will be made. This is particularly serious because of the fact that computers are known too often "crash". Sometimes, in accordance with the invention, it has been discovered that consumers are hesitant to explore a commercial website in the electronic marketplace, on account of the fact that it is also feared that exploration may cause a charge to be made improperly.

Still another problem, addressed in accordance with the present invention, is the failure of electronic commerce systems to take advantage of potential marketing links. While, of course, the use of hypertext links in website associated with electronic commerce applications is well known, whereby one retailer may provide a gateway through which consumers may be directed from one electronic site to another, other than the happenstance of the hypertext link, there is little incentive for the consumer to move from one site to another, except, perhaps, for curiosity or idleness.

In accordance with the present invention, these needs are addressed. At the same time, costs associated with advertising for the website operator and others are reduced. In addition, significant consumer benefits are achieved. Such benefits are achieved by making the site substantially self-contained, in a commercial sense. In this respect, the inventive system departs from prior art systems to the extent that it does not, per se, rely upon hypertext links to other sites in order to achieve market extension cost reduction modalities.

SUMMARY OF THE INVENTION

The inventive communications system is dedicated to the sale of first items in conjunction with the establishment of a second, preferably long-term, commercial relationship between the consumer of the first items, and sellers of second items. A central processing unit is located on the premises of a website operator. In accordance with the invention, a memory is associated with the central processing unit. The memory holds a number of interactive pages for transfer to the central processing unit. At least one of the interactive pages has at least one button associated with a consumer decision. That page further comprises information respecting a choice signified by actuation of the button. A database is coupled to the central processing unit. The database contains information respecting the cost of at least one selectable first item, information respecting at least one selectable sales condition associated with at least one second item, and information respecting discounts on the first item associated with the second item when associated with the sales condition. A modem subsystem is coupled to the central processing unit and connects the computer of a consumer to the central processing unit through a publicly accessible digital information network. The modem has the capability of transmitting a page with an interactive button to the computer of the customer. The modem is also capable of receiving and responding to an actuation of the interactive button, and sending a signal indicating the actuation and an associated consumer decision to the central processing unit. A plurality of data lines connect the central processing unit through the modem subsystem to a financial institution, coupling information respecting the consumer decision, whereby the financial institution may make a financing decision, and coupling information respecting the financing decision from the financial institution to the central processing unit indicating completion of a transaction, the modem subsystem coupling information respecting completion of the transaction to the consumer.

BRIEF DESCRIPTION OF THE DRAWINGS

Several ways of carrying out the invention are disclosed below in conjunction with the following figures, in which:

FIG. 9 is a website page functioning as a subsection of the manufacturer's catalog of FIG. 8;

FIG. 13 is a website page similar to that of FIG. 12, and illustrating the input of consumer information into the system;

FIG. 15 is a page from a website adapted to receive detailed consumer information;

FIG. 16 is a website page which functions as a catalog for the website operator;

FIG. 17 is a website page adapted to receive customer information and provide discount information applicable to a range of products; and FIG. 18 is a website page adapted to present information to a consumer respecting the state of his account and commitments.

DETAILED DESCRIPTION OF THE PREFERRED EMBODIMENT

Figure 1:
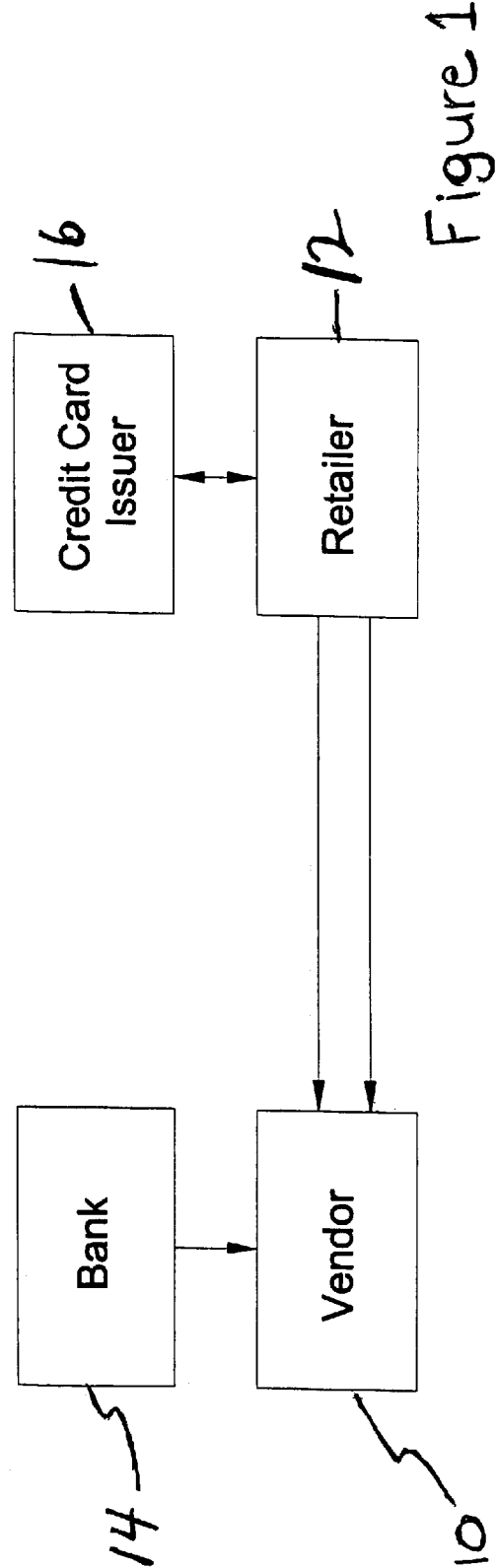
FIG. 1 is a block diagram showing interactions between participating systems in accordance with the present invention.

Referring to FIG. 1, it may be seen that the invention may be applied to commerce involving a vendor selling a relatively expensive item, and, in particular, a vendor selling automobiles. In accordance with the invention, automobile vendor 10, who operates the website, who cooperates with a vendor that sells relatively small-ticket items, such as milk, gasoline, monthly rent, or the like, such as a retailer 12. Of course the invention may be implemented between two sellers of expansive items or services. Prior to the implementation of the system of the present invention there is an agreement between the vendor 10 and retailer 12 that retailer 12 will accept referrals to customers of vendor 10. In accordance with the agreement between the vendor 10 and retailer 12, in exchange for receiving referrals from vendor 10, retailer 12 agrees to make a onetime payment or series of payments to vendor 10 in order to defray part of the cost of the automobile purchased by a customer of vendor 10.

Because of the nature of new car purchases, it is also necessary, in maximum sales onto the achieved, that vendor 10, the website operator, have an arrangement with a bank 14 or other financial institution so that qualified customers of vendor 10 may have a source for funds necessary to purchase the automobile. Finally, while not strictly required, the retailer needs a relationship with a credit card issuing company 16 so that customers of vendor 10, after being referred to retailer 12, have a convenient means to pay for their purchases. Alternatively, the retailer can issue coupons that add up to the amount committed to per month.

Figure 2:
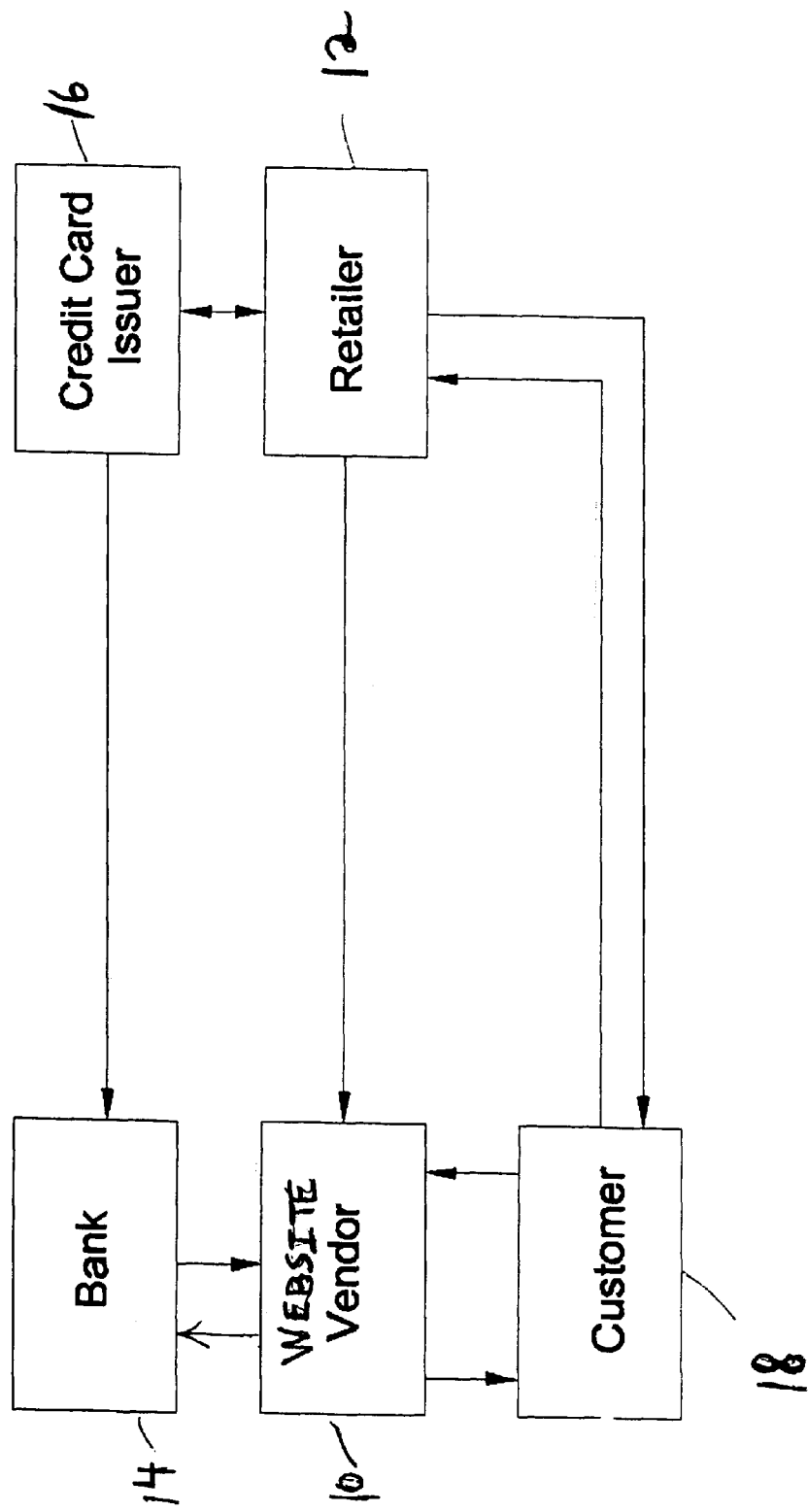
FIG. 2 is a block diagram generally illustrating the preliminary flows of information in accordance with the present invention.

As illustrated in FIG. 2, in accordance with the invention, it is contemplated that a customer 18 will have a computer or other device connected to the Internet or other electronic marketplace. If the customer wishes to buy a car, he will contact the website vendor 10, expressing such interest, requesting information and receiving information from the vendor, or call the vendor using a telephone number, such as an "800" number.

When enough information has been exchanged and an interest in making a purchase has been expressed by customer 18, such information is sent to vendor 10 who, in turn, requests information necessary to determine whether bank 14 and credit card company 16 are willing to partake in a transaction. If approvals are received from both the bank 14 and the credit card issuer 16, such information is relayed to the customer who then places an order with retailer 12 who provides him with the goods or services. It is noted that by a "retailer" in this application is meant any company which deals with consumers, and may encompass conventional retailers, shop owners, electronic marketplace shop operators, and even landlords.

In accordance with the invention, it is contemplated that the customer 18 will make minimum commitments over a period of time to make a minimum volume of purchases from retailer 12, thus enabling retailer 12 to provide a substantial payment to website vendor 10, thus substantially reducing the cost of the automobile. In addition, in accordance with the invention, it is contemplated that the relationship between the retailer 12 and credit card company 16 provides a certain basis for the charging of the account of customer 18, in order to ensure that the minimum purchase commitments made by the customer 18 will be met, or at least that the account of customer 18 will be charged for the minimum commitments.

In accordance with the present invention, it is also contemplated that the site will be visited by an numerous customers 18, and that the products of numerous retailers will be available with financing provided by numerous banks, and day-to-day credit card financing provided by numerous credit card companies. In the illustrated embodiment, only a single bank and a single credit card company have been shown for purposes of illustration.

Figure 3:
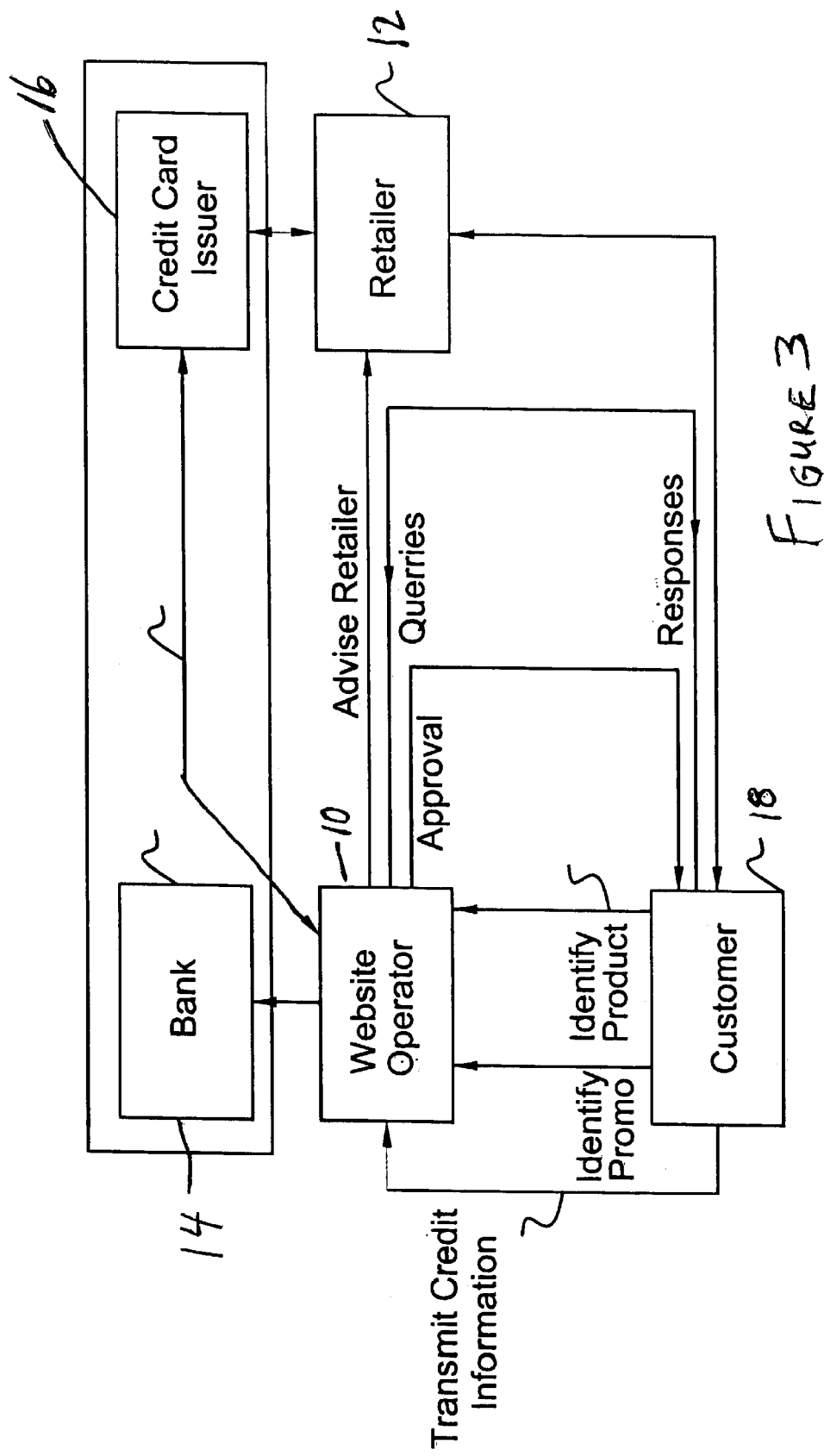
FIG. 3 is a block diagram of the inventive system.

As can be seen most clearly with reference to FIG. 3, in accordance with the invention, all of the individuals and companies involved in a proposed transaction are electronically connected. As noted above, customer 18 has a personal computer or other device which enables electronic commerce. This enables customer 18 to be linked to website operator vendor 10.

Relatively rapid approvals of credit can be implemented by an electronic connection between website operator 10 and bank 14, although conventional financing approval links, such as mail, facsimile, and telephone may be used.

For several reasons, electronic links are advantageously implemented in accordance with the invention between the website operator 10 and the credit card company 16.

While links between website operator 10 and retailer 12 may be electronic, the relatively time-insensitive nature of the communications between website operator 10 and retailer 12 render such electronic links of lesser importance. Likewise, they need not be electronic links between retailer 12 and customer 18, as any means of communication between retailer 12 and customer 18 as the customer finds convenient is used in accordance with the present invention. In connection with this, it is noted that the invention does contemplate the sale of many items from retailer 12 to customer 18. These items include items which are customarily only after personal contact and review of the item. For example, these items may be fruits and vegetables at the local supermarket, china at a gift shop, or gasoline at an automated service station pump.

As discussed generally above, customer 18, in accordance with the invention, identifies the primary product which he wishes to buy, such as a particular make and year of automobile. He is then given the opportunity to commit to buy items such as groceries, a vacation, a rental apartment, or the like. The customer is given the opportunity, as will be described in detail below, to design a promotional package particularly to his liking.

This package is achieved through the provision of a mechanism for the customer 18 to send queries to website operator 10 and, complementary to these operations, a mechanism for the website operator to send responses to customer 18.

When such a package has been designed, the customer 18 provides credit information to website operator 10 who, in turn, sends this information along to bank 14 and credit card company 16. These companies then advise the website operator of their approval, and such approvals are transmitted by the website operator 10 to customer 18.

Figure 4:
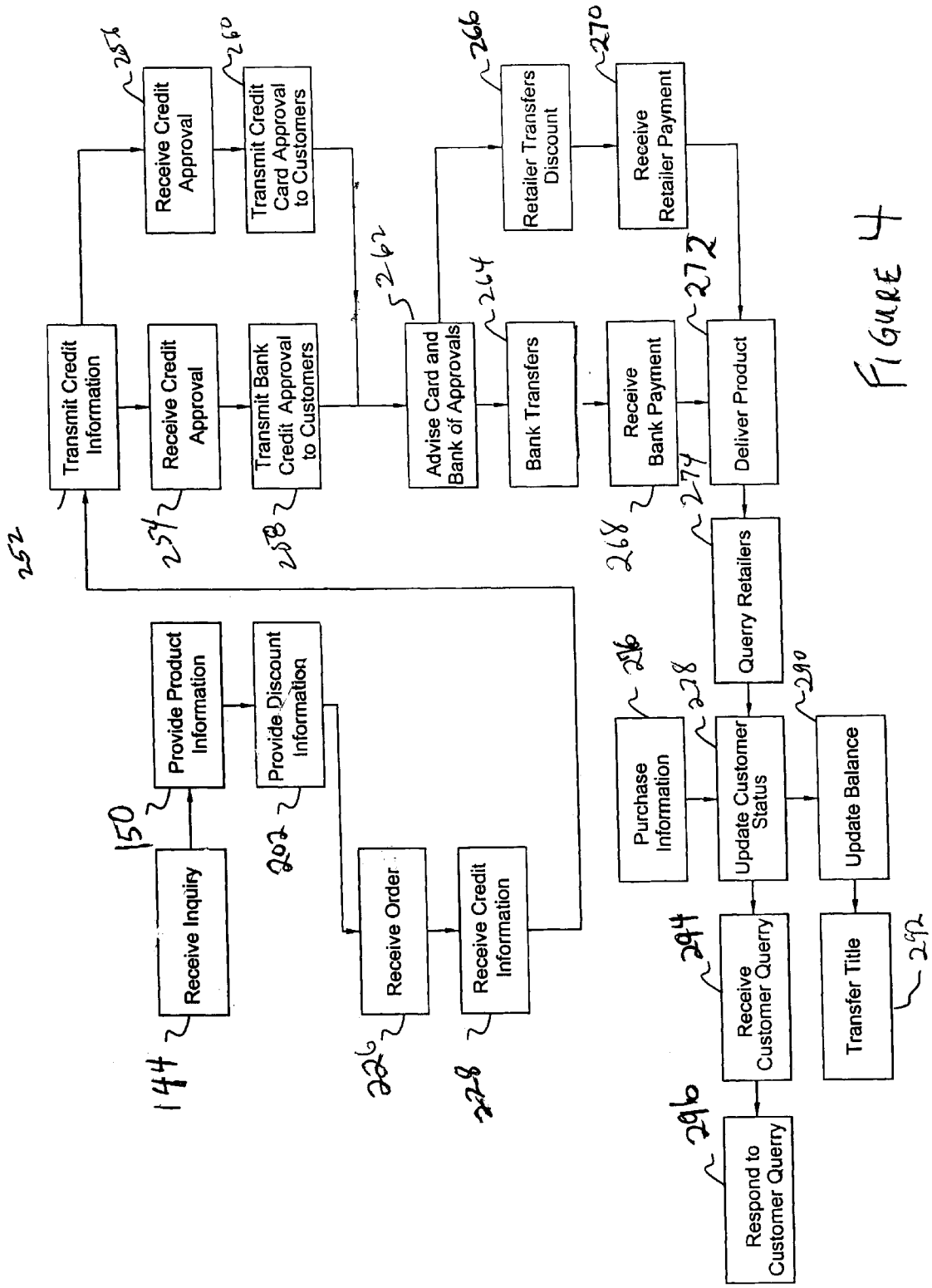
FIG. 4 is a block diagram of the algorithm of the present invention.

The operation of the inventive system may be understood with reference to FIG. 4 which details, generally, the operation of the system of the present invention with reference to a number of website pages illustrated in FIGS. 5 through 17.

Figure 5:
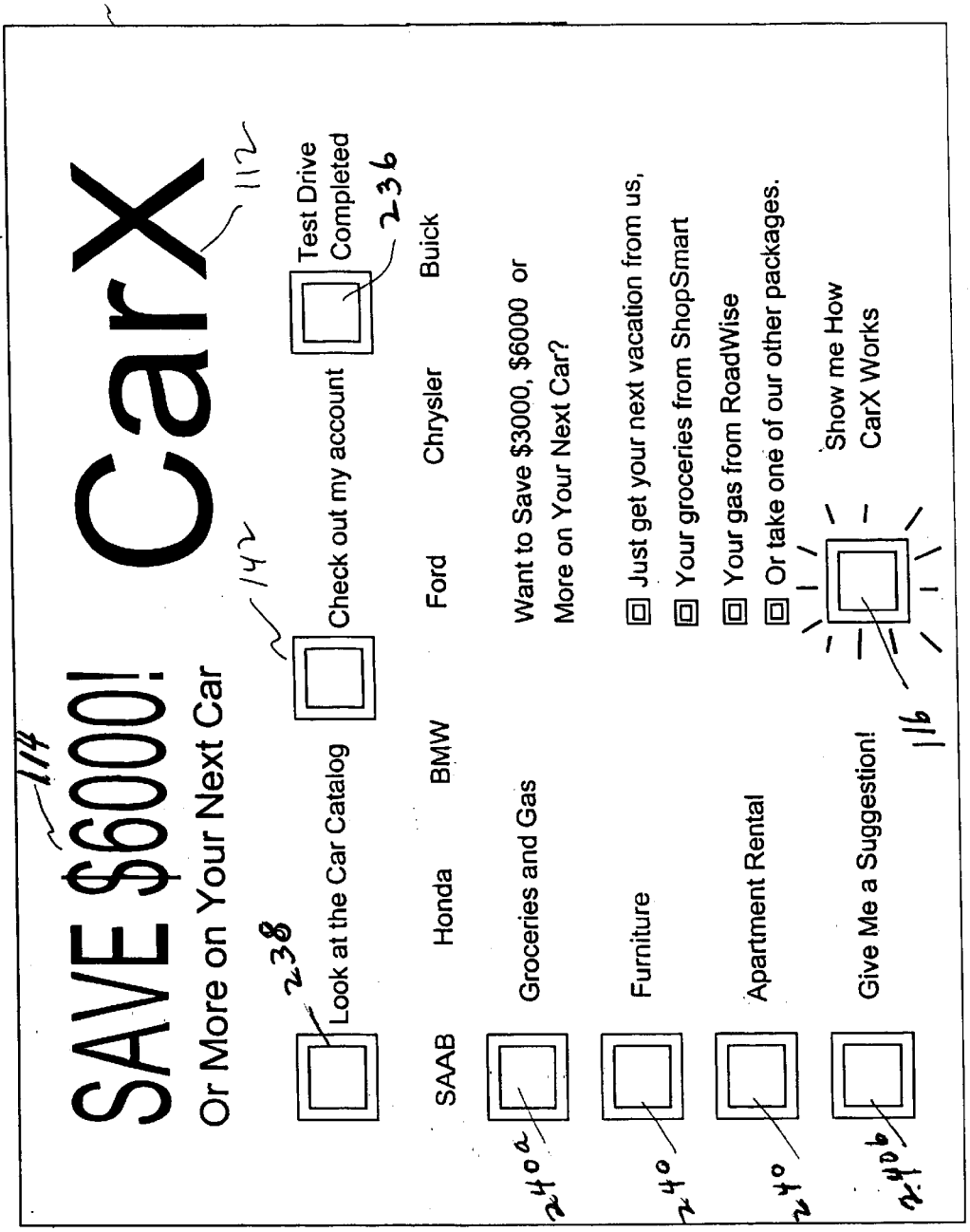
FIG. 5 an illustration of a home page of a website for implementing the inventive algorithm illustrated in FIG. 4.

A home page 110 of website operator 10 is illustrated in FIG. 5. As is the practice in the electronic marketplace, a home page 110 is viewed by potential customers through the Internet, using a computer connected to the Internet by a telephone line or other connection. In accordance with the invention, home page 110 includes the name 112 of vendor 10. General descriptive material (114) describing the nature of the transaction is also included on home page 110.

Home page 110 as a dynamic button 116. By "dynamic" is meant a button whose visual characteristics change over time. For example, button 116 may be made to blink once every second, or it may change color. It is also possible for button 116 to change form from time to time changing, for example, from a car, to a dollar sign, to a steering wheel. In accordance with the preferred embodiment of the inventive dynamic button 116 remains shaped as a button, but blinks on and off.

Figure 6:
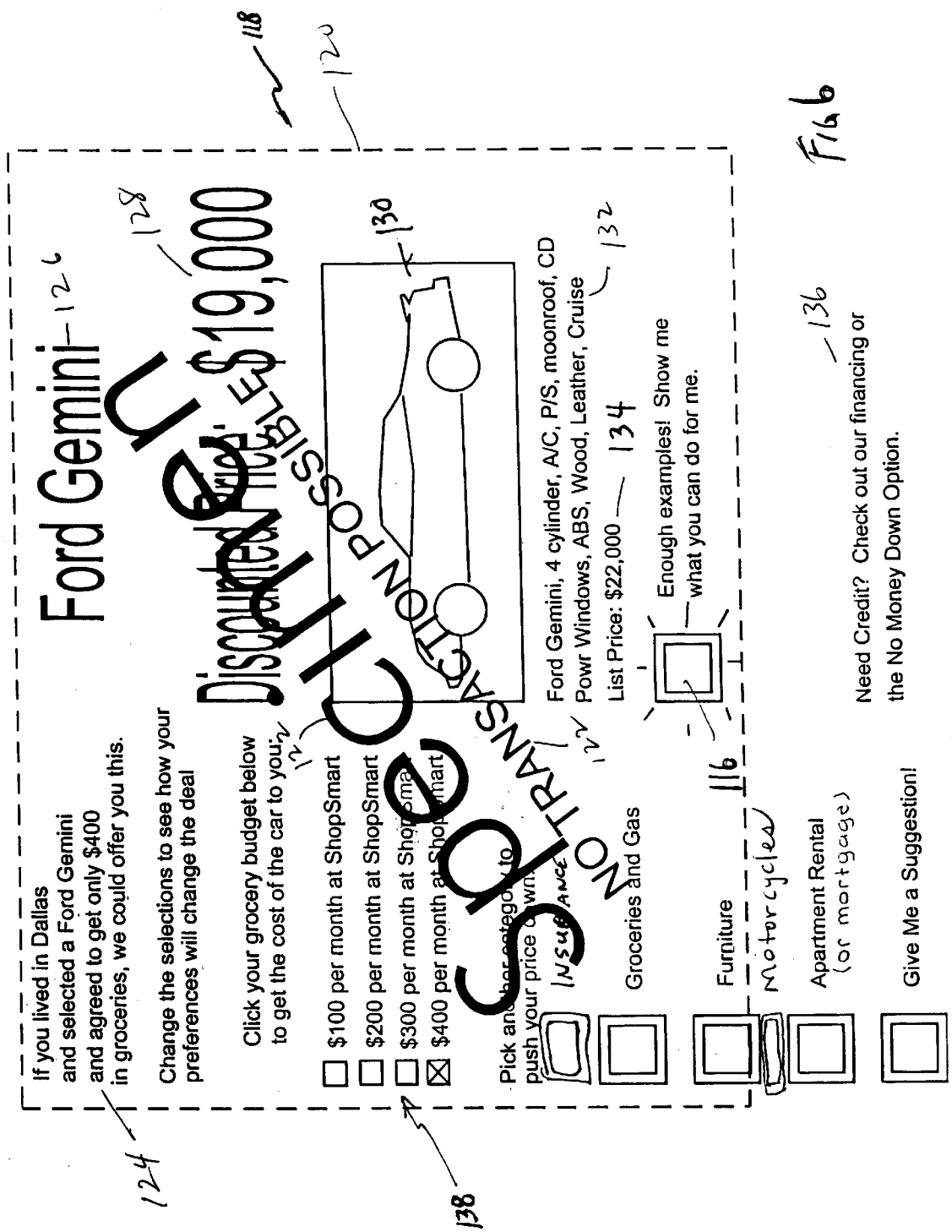
FIG. 6 is an illustration of an information providing page in a website adapted to provide information to a user of the website, without implementing a commercial transaction.

When dynamic button 116 is clicked on or hit by the consumer viewing home page 110, a sample screen 118, illustrated in FIG. 6, is downloaded to the computer of customer 18. It is noted that the various pages need not fit the format of a conventional computer screen, as is defined by dashed line 120. While only that portion of sample page 118 illustrated in FIG. 6 within the space defined by dashed line 120 may be viewed at a given time, all that customer 18 need do is to scroll to see the rest of page 118 illustrated in FIG. 6.

In order to reduce consumer anxiety respecting the possibility of accidentally triggering a sale and an attendant charge, sample page 118 includes a designation 122 clearly identifying page 118 as nonoperative from a commercial point of view. In particular, page 118 may be labeled clearly with large type with words to the effect that no transaction is possible using the page. Given this assurance, the consumer is then most likely to attempt to experiment and play with the page, with the objective of learning of the type of transaction which may be accomplished using the website. At the same time, the consumer also has the possibility of becoming at ease and skilled in the use of the website illustrated in the figures.

In principle, full functionality may be given to sample page 118. In addition, sample page 118 may lead to a whole set of sample pages corresponding to actual pages. Alternatively, sample page 118 may be given limited functionality in order to encourage visitors to the website to visit the commercially functioning portion of the website.

In accordance with the preferred embodiment of the invention, sample page 118 includes information 124 which gives the basis for a hypothetical situation resulting in the sale of a product 126 at a discount price indicated by type 128. Also in accordance with the preferred embodiment, sample page 118 as an illustration 130 of the product, in this case, an automobile known as a Ford Gemini.

It is also contemplated in accordance with the invention that a description of the product in the form of specifications 132 is provided, together with the retail price of the product at indication 134. In addition to this, it is contemplated that various messages 136 will also be displayed, relating to credit, options, and so forth.

Also in accordance with the preferred embodiment of the invention, in order for the prospective purchaser to achieve an understanding of the transaction being offered, there is also provided functionality in some parts of the sample page 118. In this case, such functionality can be achieved by changing the commitment to buy groceries by clicking on any one of four preset selections ranging between $100 per month to $400 per month, as indicated at 138.

Figure 7:
FIG. 7 is an illustration of a card catalog used in accordance with the present invention.

When the person visiting the website clicks on button 116, he is brought to the car catalogs page of FIG. 7. FIG. 7 is simply an alphabetical list of various car makes and models, and each item 140 in this list acts as a link to a page devoted to the particular product listed. For example, if a user were to click on the button which says "Ford", he would receive the "Ford Catalog" page of FIG. 8. In similar fashion, clicking the "Ford" button 142 in FIG. 5 will also cause the downloading of the "Ford Catalog" page of FIG. 8 to the computer of the customer 18 using the website.

Such clicking constitutes a "receive inquiry" operation as indicated at step 144 in FIG. 4. In accordance with the invention any one of a number of inquiries may be designed into the various web pages in order to provide consumer 18 in the desired information respecting the proposed transaction, including, information respecting the relatively high ticket automobile purchase, as well as information respecting the required supplementary discount supporting transactions which follow the initial purchase of the automobile.

Figure 8:
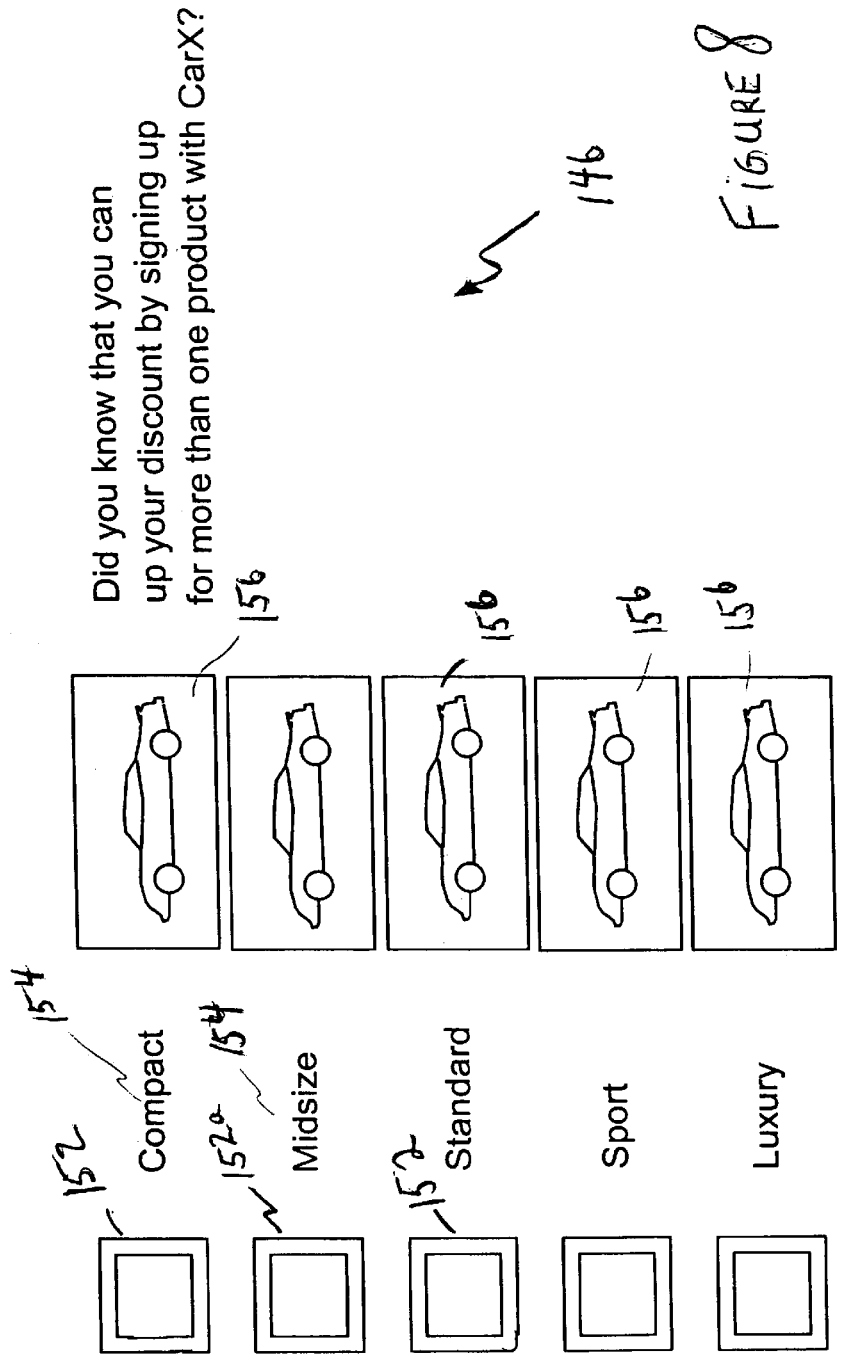
FIG. 8 is an illustration of a website page functioning as the catalog of a particular manufacturer.

As noted above, such clicking requests for information result in the presentation of various pages, such as the Ford catalog page 146 in FIG. 8. Such a presentation of information by the downloading of page 146 to the customer 18 is an embodiment of the "provide product information" step 150 in FIG. 4.

Subsequent provision of information in response to subsequent inquiries is a characteristic of the preferred embodiment as illustrated in the figures. In particular, the "Ford Catalog" page 146 includes a number of buttons 152 associated with the various types of Ford automobiles in the various indicated categories indicated by type 154. In addition, photographs 156 of representative automobiles for each category are located beside their designation in type 154. In accordance with the preferred embodiment, buttons 152, type 154 and photographs 156 may all be made into buttons which may be clicked on to provide further information. For example, if the consumer clicks midsize button 152a, this will cause a "receive inquiry step" 144 and result in providing information by the artifice of presentation of the "Midsize Fords" page 158 illustrated in FIG. 9.

Page 158 in FIG. 9 includes its own set of illustrations 160 showing various midsize Ford automobiles. In addition, basic information on each automobile is shown in areas 162. Consumer action is invited by a number of buttons 164 with associated invitations to action 166. Also in accordance with the present invention, illustrations 160 may be made buttons which would trigger downloading of the next screen. It is noted that in accordance with standard procedure, when a cursor is placed over, for example, an illustration 160 which also serves as a button to download subsequent pages, the cursor will turn into a schematic illustration of a human hand with the index finger pointing out to push a button so that the consumer knows that the illustration 160 will cause the downloading of the page associated with the button.

Figure 10:
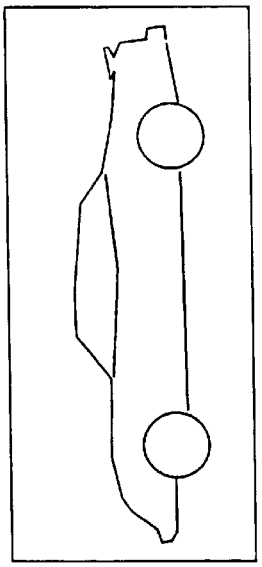
FIG. 10 is a website page functioning as a product description toward a particular product contained within the range of products covered by the website page of FIG. 9, and including deal-triggering buttons.

In particular, when illustration 160a is clicked, it causes the downloading of the "Ford Gemini" page 168 illustrated in FIG. 10. The "Ford Gemini" page 168 includes an indication 170 of the list price of the car, and an indication 172 of its lowest possible discounted price.

Because the various retail services and products which may be offered will vary from city to city and from state to state, the consumer is directed at designation 174 to indicate his city of residence at position 176 and his state of residence at position 178. Once the consumer has filled in this information, he is invited at type 180 to select a product which will finance his discount. Underneath are located descriptions 182 of various products and buttons 184 associated with each of the products described by descriptions 182. Here again, both the buttons 184 and the descriptions 182 may be made active buttons to cause the downloading of a subsequent information conveying page. Such artifices may be used in all of the web pages illustrated in this patent.

Figure 11:
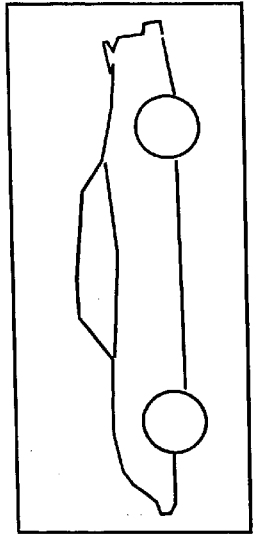
FIG. 11 is a website page ready to receive information from a consumer.
Figure 12:
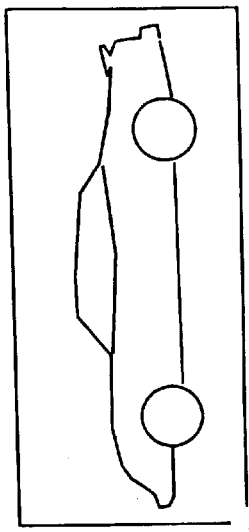
FIG. 12 is a website page similar to that of FIG. 11 and providing information to the consumer in response to consumer entered information.

In particular, if button 184*a* is actuated in FIG. 10, the system downloads page 186 illustrated in FIG. 11, which initially shows no cost but invites, at designation 188, the visitor to the website to select a minimum monthly grocery commitment at the participating store in this case, ShopSmart. While, in principle, it is contemplated that a default commitment may be shown when the consumer is first directed to page 186, either possibility may be implemented. In any case, a relatively long time commitment is shown as a default at menu 190, as this will result in maximizing the discount to the consumer. In order to select a commitment, buttons 192 are provided together with associated descriptive material 194. If the consumer were to click on button 192*a* in FIG. 11 on page 186, the result would be the downloading of page 196 illustrated in FIG. 12. Page 196 is substantially identical to page 186, except that it includes cost information as indicated at 198. In addition, the conditions associated with that cost information are indicated by type 200 located just below type 198.

The provision of page 196 corresponds to the "provide discount information" step 202 illustrated in FIG. 4. The "provide discount information" step 202 may also be repeated. For example, by pushing the "scroll down" button 204, the consumer will see the display on his computer change to that illustrated in FIG. 13. The scroll menu 206 includes a number of entries 208. The selected menu items selected by the consumer are highlighted, as illustrated in FIG. 13.

Figure 14:
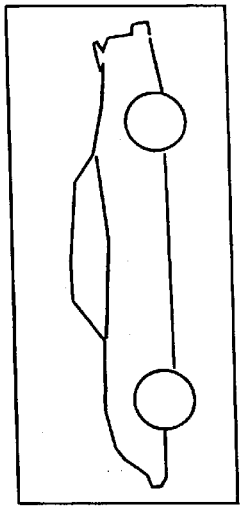
FIG. 14 is a website page similar to that of FIG. 12 showing a different price in response to different input information from the consumer.

Referring back to FIG. 12, if the consumer wishes to lower his cost, he is invited at designation 210, to push another button 212. It button 212 is clicked, result is the presentation of page 214, substantially as illustrated in FIG. 14, but with the cost information different from that in FIG. 13.

However, after the consumer clicks a button 216 indicating a commitment to spend $75 per month at a particular gasoline retailer, the price indicated drops from $19,000 to $17,500. At this point, the consumer may elect to add yet another category to continue to lower his price, or he may, instead, decide to take a test drive or agree to buy the product. He may indicate his desire to take a test drive at button 218 adjacent designation 220. A test drive may be arranged by making a telephone call to the customer, inviting the customer or to make a telephone call, or by e-mail communication.

Similarly, he may elect to accept purchase of the automobile at a button 222 near designation 224 which indicates his desire to purchase the automobile. Such acceptance result in the "receive order" step 226 illustrated in FIG. 4.

Whether the consumer selects a test drive or a purchase, the form of FIG. 15 is useful to gather appropriate consumer information in the "receive credit information" step 228 in FIG. 4. Thus, in accordance with the preferred embodiment, the clicking of either button 222 or 218 in FIG. 14, results in the downloading of information gathering page 230, illustrated in FIG. 15.

At page 230, the consumer is invited to fill in his name, address, city, state, zip code, E.-mail address, telephone, facsimile number, credit card number, type, and date of expiration of that credit card, his bank, account number, branch, employer and related information of the type typically gathered to clear credit. The same is indicated by type 232 on page 230 in FIG. 15.

Once this information is completed, button 234 is made active and the consumer make click on button 234 to complete the transaction, subject to credit approval, or arrange for a test drive. In the event that a test drive is arranged, the consumer may then simply complete the transaction during the test drive, or may return to the website at a later date to complete the transaction by clicking button 236, causing the display of the latest version of the deal engineered by the consumer, in the case of the instant example, the display of page 214 in FIG. 14.

At this point, the consumer can continue to change the deal to his liking, and once he pushes button 222, the transaction is completed, subject to credit approval, which will be communicated to the consumer upon receipt of approval or disapproval.

In a manner similar to the activation of button 116, home page 110 is provided with a button 238 which also brings the consumer to the car catalog page of FIG. 7. Likewise, buttons to 240 bring the consumer to the described page, for example, in the case of button 240*a*, a display similar to that illustrated in FIG. 11, but with a default car and cost and an appropriate scroll down key to change products is presented to the consumer. In similar fashion, button 240*b* will bring the consumer to the "suggestions" page 242 illustrated in FIG. 16. This page merely consists of a list of various products in alphabetical order. Each of the items 244 on the list acts as a button to link to an appropriate page with information.

Also in accordance with a present invention, it is contemplated that a page indicating discounts, where there has been no automobile selected, instead of indicating a cost figure, will, instead, indicate a discount figure. Such a page 246 is illustrated in FIG. 17. In the FIG. 17, one sees a discount of $3000 indicated by type 248. Such a discount is indicated for a grocery commitment of $400 per month at the participating supermarket ShopSmart. This is indicated by the placement of the letter "x" at 250. Other features of page 246 are similar to the discounted price indicating pages illustrated in FIGS. 11–14.

Referring to FIG. 4, upon receipt of a completed credit application in the form of page 230 in FIG. 15, this information is transmitted to the bank 14 and the credit card company 16 at step 252. Upon receipt of the credit information of the potential customer, the bank and the credit card company act on the same. If the bank approves the transaction, this information is received by the website operator at step 254. Likewise, if the credit card company approves the transaction, this information is received by the website operator at step 256.

If either of these organizations does not give an approval, alternate banks and credit card companies may be contacted in order to try to shop the loan and/or the credit card relationship. Insofar as the automobile is a collateral with respect to the transactions with the bank and the credit card company, such a loan should be relatively easy to implement.

Once approvals have been obtained from a bank and a credit card company, this information is transmitted to the potential customer at steps 258 and 260. At the same time, the bank must be told that the credit card company has approved the transaction and the credit card company must be told that the bank has approved the transaction. This is achieved at step 262, resulting in the completion of the contract surrounding the transaction.

Once the bank has been informed via electronic channels respecting the formation of the contract, the bank transfers the principal amount to the website operator 10 at step 264. In similar fashion, once the retailer receives notification of the contract, he transfers the amount of the discount to the website operator at step 266. This last transfer, as well as the transfer by the bank may both be made electronically, resulting in complete payment being received by the website operator in two transactions indicated at steps 268 and 270. Upon receipt of both parts of the purchase price of the automobile, the website operator delivers the product at step 272. In accordance with the invention, a portion of either or both of these amounts is retained by the website operator.

At this point, the website operator changes his function from a deal maker to that of a service provider, providing information to the participants in the transaction. In accordance with the invention, it is contemplated that both the bank and the credit card company will have security interests in the automobile sold by the website operator. In principle, such interests may be non-subordinated and proportional to the outstanding balance on the bank and/or and an agreed to percentage of the remaining commitment in sales to the retailer. Alternatively, the interest of the retailer may be subordinated to that of the bank, insofar as the bank may have a larger interest in the monies associated with the remaining term of the contract between the parties.

In accordance with its service provider function, the website operator 10 periodically queries retailers at step 274, respecting the extent to which the customer 18 has met his commitment. In principle, it is contemplated in accordance with the invention that the minimum amount will be charged to the credit card every month, and that, if the customer does not consume products up to the amount charged by the credit card company, the customer 18 will accumulate a credit which he may consume at any time.

In accordance with the present invention, it is contemplated that the website operator will periodically query the retailers and the bank and any other companies participating in the transaction. This is done for the purpose of generating tallies of purchases, payments, and associated information in a register which keeps track of the status of the subject transaction.

As information is received from the retailer or retailers to which long-term commitments have been made, the website operator updates customer information in response to information provided by such retailer or retailers at step 276. The result is to update customer status at step 278 to produce a page 280 such as that illustrated in FIG. 18. Page 280 includes the name 282 of the customer 18, address information 284, and the date at which such information was current.

Page 280 also includes a field 286 showing, for a first retailer, the purchases made the previous month, the purchases made to date during the current month and the amount of money which must be spent with the retailer in order to meet the minimum commitment that month. This field also shows the consumer is meeting his minimum monthly commitment in accordance with the contract which he entered into to purchase the automobile that received the discount from the particular retailer.

In addition, page 280 includes a field 280 a which has identical information respecting a second retailer to which the customer 18 has made a minimum monthly commitment.

In accordance with the invention, it is also noted that some commitments to retail service and/or product providers may not be of a monthly nature. For example, there may be a commitment to purchase a vacation for one or more individuals within a specified time period. If such vacation is not purchased within the committed time period, the credit card of the consumer may be charged with the cost of the vacation. In accordance with the present invention, such commitment may also appear on screen 280.

Also, in accordance with the present invention, it is contemplated that the credit card company need not always be involved as a separate entity, insofar as banks often have credit card services. Finally, it is also possible to employ a bank with automatic deductions from the account of customer 18. In accordance with this arrangement, the customer 18 would also be a customer of the bank, and the bank would provide the purchase price, or a portion of the purchase price for the automobile. In this respect, the bank may be agreeable to financing and the sale of the automobile at a lower rate of interest, insofar as it has acquired customer 18 as the bank's customer.

As information is retrieved from retailers at step 274, and customer status is updated, the information is sent to page 280 at step 290 in FIG. 4. In addition, the website operator may also receive information on the payment of the loan made by the bank, and when the bank loan is completely paid off and the commitment to the retailer or retailers has been made, the Website operator may implement the transfer of title at step 292. Finally, as is alluded to above, it is contemplated that screen 280 will, in response to consumer inquiries at step 290, be made available to customers at step 296 in FIG. 4.

While illustrative embodiments of the invention have been described, it will be apparent to those of ordinary skill in the art that minor modifications of the disclosed embodiment may be made without departing from the spirit and scope of the invention, which is limited and defined only by the appended claims.

What is claimed is:

1. A communications system dedicated to the sale of first items in conjunction with the establishment of a long-term commercial relationship between the customer of said first items and sellers of second items, comprising:
   (a) a central processing unit located on the premises of a website operator;
   (b) memory associated with said central processing unit, said memory holding a number of interactive pages for transfer to said central processing unit, at least one of said interactive pages having at least one button associated with a customer decision, and at least one of said pages further comprising information respecting a choice signified by actuation of said one button;
   (c) a database coupled to said central processing unit, said database i) containing information respecting the cost of at least one selectable first item, ii) containing information respecting at least one selectable sales condition associated with at least one second item, and iii) containing discounts on said first item associated with said second item when associated with said sales condition;
   (d) a modem subsystem coupled to said central processing unit and connecting the computer of a customer to said central processing unit through a publicly accessible digital information network, said modem having i) the capability of transmitting a page with an interactive button to said computer of said customer and ii) the capability of receiving and responding to an actuation of said interactive button and sending a signal indicating said actuation and an associated customer decision to said central processing unit;

(e) data lines connecting said central processing unit through said modem subsystem to a financial institution coupling information respecting said customer decision whereby said financial institution may make a financing decision, and coupling information respecting said financing decision from said financial institution to said central processing unit indicating completion of a transaction, said modem subsystem coupling information respecting completion of said transaction to said customer.

2. A communications system as in claim 1, wherein said first items are relatively expensive items and said second items are relatively either expensive or inexpensive items.

3. A communications system as in claim 1, wherein said first items are automobiles and said second items are retail store goods.

4. A communications system as in claim 1, wherein first items are automobiles and said second items are relatively inexpensive items.

5. A communications system as in claim 1, wherein said second items comprise a series of separate items, and each of said second items has a time associated with it.

6. A communications system as in claim 5, wherein said seller of said second items is connected to a credit card company by an electronic charge or credit card system, whereby the payment of said second items is assured.

7. A communications system as in claim 6, wherein card company is connected by a data connection to said central processing unit, and said central processing unit receives information respecting transactions with said seller of said second items, and generates a tally of the same.

8. A communications system dedicated to the sale of first items and second items, comprising:

(a) a central processing unit located on the premises of a website operator;

(b) memory associated with said central processing unit, said memory holding a number of interactive pages for transfer to said central processing unit, at least one of said interactive pages having at least one button associated with a customer decision, and at least one of said pages further comprising information respecting a choice signified by actuation of said one button;

(c) a database coupled to said central processing unit, said database i) containing information respecting the cost of at least one selectable first item, ii) containing information respecting at least one selectable sales condition associated with at least one second item, and iii) containing discounts on said first item associated with said second item when associated with said sales condition;

(d) a modem subsystem coupled to said central processing unit and connecting the computer of a customer to said central processing unit through a publicly accessible digital information network, said modem having i) the capability of transmitting a page with an interactive button to said computer of said customer and ii) the capability of receiving and responding to an actuation of said interactive button and sending a signal indicating said actuation and an associated customer decision to said central processing unit;

(e) data lines connecting said central processing unit through said modem subsystem to a financial institution coupling information respecting said customer decision whereby said financial institution may make a financing decision, and coupling information respecting said financing decision from said financial institution to said central processing unit indicating completion of a transaction, said modem subsystem coupling information respecting completion of said transaction to said customer.

9. A communications system dedicated to the sale of first items and second items, comprising:

(a) a central processing unit located on the premises of a website operator;

(b) memory associated with said central processing unit, said memory holding a number of interactive pages for transfer to said central processing unit, at least one of said interactive pages having at least one button associated with a customer decision, and at least one of said pages further comprising information respecting a choice signified by actuation of said one button;

(c) a database coupled to said central processing unit, said database i) containing information respecting the cost of at least one selectable first item, said first item being a product or service desired by and purchased by customers and customarily bought after personal contact and/or review of the item, ii) containing information respecting at least one selectable sales condition associated with at least one second item, said second item being a product or service desired by and purchased by customers and customarily bought after personal contact and/or review of the item, and iii) containing discounts on said first item associated with said second item when associated with said sales condition;

(d) a modem subsystem coupled to said central processing unit and connecting the computer of a customer to said central processing unit through a publicly accessible digital information network, said modem having i) the capability of transmitting a page with an interactive button to said computer of said customer and ii) the capability of receiving and responding to an actuation of said interactive button and sending a signal indicating said actuation and an associated customer decision to said central processing unit;

(e) data lines connecting said central processing unit through said modem subsystem to a financial institution coupling information respecting said customer decision whereby said financial institution may make a financing decision, and coupling information respecting said financing decision from said financial institution to said central processing unit indicating completion of a transaction, said modem subsystem coupling information respecting completion of said transaction to said customer.

* * * * *